United States Patent Office 3,534,532
Patented Oct. 20, 1970

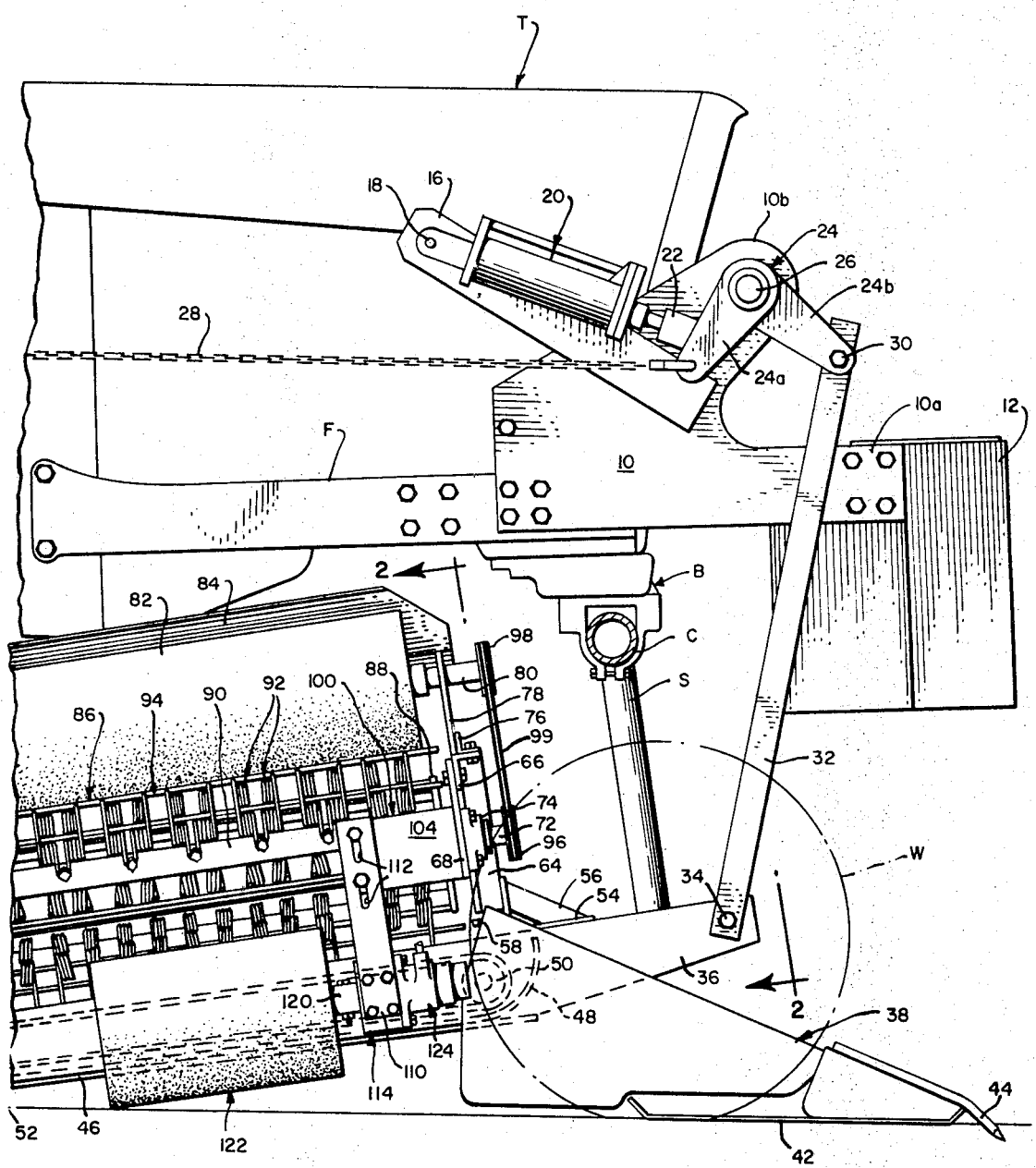

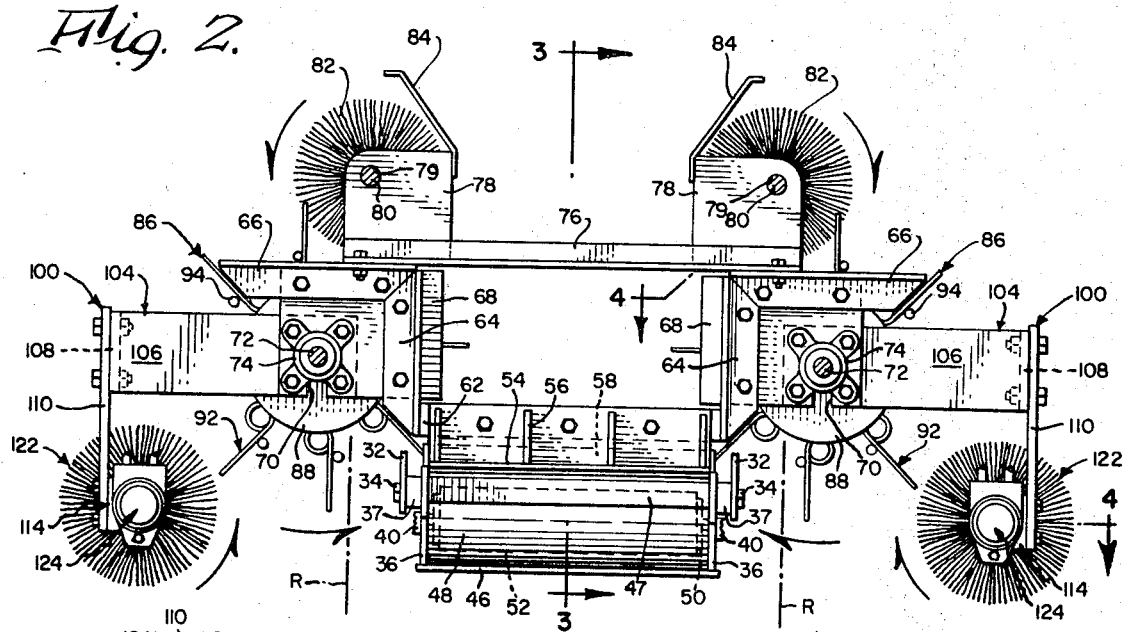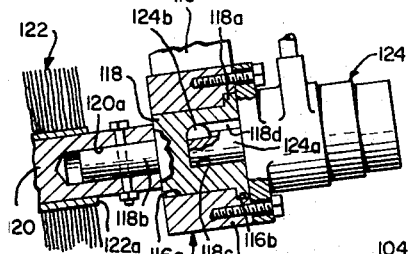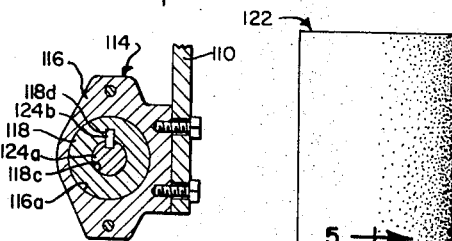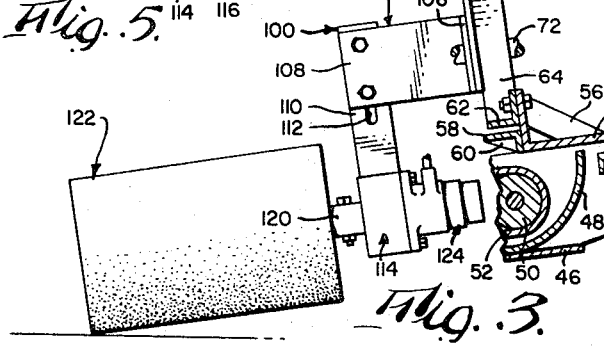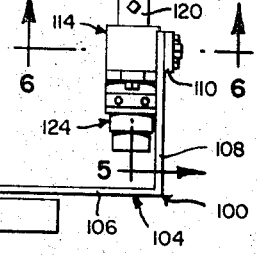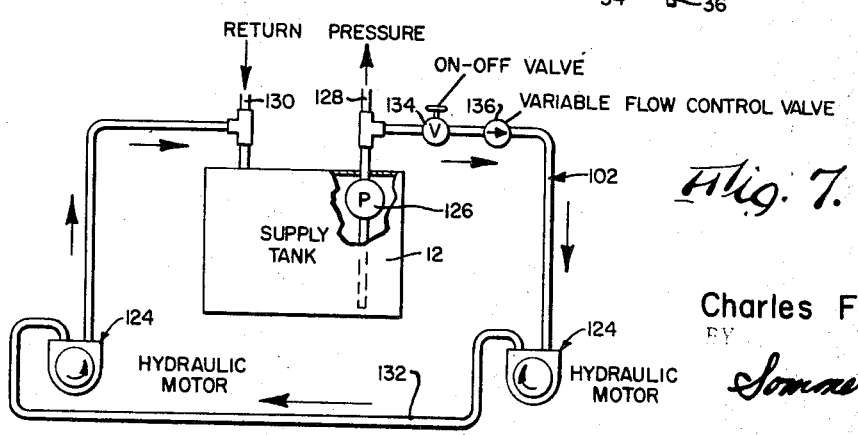

---

3,534,532
BEAN HARVESTER PICK-UP BRUSH MEANS
Charles F. Windhausen, Pompano Beach, Fla., assignor to Chisholm-Ryder Company, Inc., Niagara Falls, N.Y., a corporation of New York
Filed Feb. 5, 1968, Ser. No. 702,954
Int. Cl. A01d *45/22, 45/24*
U.S. Cl. 56—19                                7 Claims

ABSTRACT OF THE DISCLOSURE

A tractor is equipped with a bean harvester or picker including a frame, a central conveyor, two pick-up reels and a cleaning brush mechanism for each reel, and such harvester is provided with the inventive pick-up brush means including a pick-up brush mechanism for each reel and a common hydraulic drive system having a hydraulic drive motor for each brush mechanism, with such motors being arranged in series in a hydraulic loop connected to a pump and a hydraulic fluid supply reservoir.

BACKGROUND OF THE INVENTION

Field of the invention

This invention relates to improvements in apparatus for harvesting or picking beans, especially snap and lima beans, and more particularly to new and improved pick-up brush means for such bean harvesting apparatus.

Description of the prior art

In bean harvesting apparatus of the type disclosed and claimed in U.S. Pat. No. 3,165,876, a tractor is equipped with a harvester having a frame adapted to be propelled by the tractor along two adjacent rows of bean plants in the field. A threshing reel is journalled on the frame to rotate about an axis arranged above and extending longitudinally of each row, but slightly offset to the inboard side thereof. Picking fingers project radially from each reel to engage and comb the plants in each row, and a drive mechanism rotates each reel to effect upward movement of the picking fingers through the plants in each row. A central conveyor is arranged between the upwardly moving sides of the reels to receive the bean pods, leaves and stems removed from the bean plants by the upwardly moving picking fingers on each reel. A rotary reel cleaning brush is journalled on the frame above and on an axis parallel with each reel axis and has bristles interleaving with the crests of the rising picking fingers, and a drive mechanism rotates each cleaning brush and adjacent reel about their respective axes, but the cleaning brush rotates in a direction opposite to that of the adjacent reel, in order to move the interleaved bristles downwardly in opposition to the rising picking fingers and thereby propel any bean pods etc. stuck in the fingers toward the conveyor. As the harvester moves along the rows, a V-shaped or split, dual gathering apron or prow assembly extends forwardly from the frame and slides on the ground in advance of each reel to straddle the plants in each row. Each of thees apron assemblies is designed to gather or lift the prostrate branches of the bean plants in each row to an erect position for engagement with the picking fingers of the reels. In order to hold the bean plants in each row erect while travelling rearwardly over and between the aprons, and to overcome the friction produced by the two aprons of each assembly in so lifting the prostrate branches in each plant row, a driven gathering chain provided with outstanding plant engaging lugs or knobs is associated with each apron and the lugs project inwardly from each apron toward the other to propel the plants in each row along the adjacent apron.

However, as the plants reach the threshing reels, their outboard branches still have a tendency to droop down and spread out below the sweep of such reels, with consequent reduction in the desired picking efficiency and effectiveness.

SUMMARY OF THE INVENTION

Accordingly, the primary object of the present invention is to provide new and improved pick-up brush means arranged behind the gathering aprons and chains, on the downwardly moving side of the reel and slightly to the outboard side of the bean plants in the adjacent row, in order to urge the branches of the bean plants therein upwardly and inwardly into intimate engagement with the downwardly moving picking fingers for thorough combing of the bean plants in such row, and hence increase both the efficiency and effectiveness of the picking operation. To this end, the inventive pick-up means include a rotary brush journalled on the harvester frame about an axis generally parallel to, but spaced below and on the downwardly moving side of the reel axis. Such rotary brush has bristles engageable with the bean plants in the adjacent row, and drive means rotating the brush in a direction opposite to that of the adjacent reel, whereby the upwardly moving bristles of the brush force the bean plants in the adjacent row upwardly and inwardly into intimate combing engagement with the downwardly moving picking fingers.

Another object is to provide new and improved pick-up brush means including a sub-frame arranged on the harvester frame forwardly of the reel, extending laterally beyond the downwardly moving side of the reel, rearwardly along such downwardly moving side of the reel and downwardly to provide journal means supporting the drive means, and a rotary pick-up brush shaft operatively associate with and extending rearwardly from the journal means along the downwardly moving side of the reel and driven by the drive means. The journal means preferably forms a cantilever support for both the brush shaft and the drive means.

A further object is to provide new and improved pick-up brush means wherein the drive means include preferably a hydraulic fluid motor operatively associated with the journal means and rotary brush shaft, and the depending member of the sub-frame preferably is adjustable longitudinally for varying the position of the pick-up brush relative to the adjacent reel.

An additional object is to provide new and improved pick-up brush means including a pick-up brush mechanism for each reel, preferably a hydraulic fluid drive motor for each mechanism, and preferably a common hydraulic drive system including a hydraulic circuit having a supply reservoir provided with a pump and a loop connected to the pump and reservoir and containing such motors arranged in series. The common hydraulic system and series arrangement of motors is designed for simplicity of structure, and hydraulic fluid is preferred in order to provide a constant speed of pick-up brush rotation despite ambient temperature changes and r.p.m. changes of the tractor power drive. However, the hydraulic system is adjustable for varying the rotational speed of the pick-up brush in accordance with rankness of plant growth.

Additional objects and advantages of the invention will become evident upon consideration of the following detailed description and accompanying drawings, wherein:

BRIEF DESCRIPTION OF THE DRAWINGS

FIG. 1 is a fragmentary side elevation illustrating the front portions only of a tractor equipped with a bean harvester provided with pick-up brush means constituting a preferred embodiment of the invention;

FIG. 2 is a partial transverse section taken generally along line 2—2 of FIG. 1 and illustrating the cross sectional structure of portions of the harvester apparatus including the frame, the central conveyor, the threshing reels, the upper reel cleaning brushes, and portions of the lefthand and right pick-up brush mechanisms of the invention;

FIG. 3 is a partial vertical longitudinal section taken generally along line 3—3 of FIG. 2, with parts such as the conveyor, frame, reels and cleaning brushes removed for more clearly showing essential structure of the righthand inventive pick-up brush mechanism;

FIG. 4 is a fragmentary horizontal longitudinal section taken generally along line 4—4 of FIG. 2, with various parts removed for clarity in illustrating essential structure of the righthand inventive pick-up brush mechanism shown in FIG. 3;

FIG. 5 is a fragmentary longitudinal section taken generally along line 5—5 of FIG. 4 and illustrating details of the journalling and hydraulic drive motor structure of the righthand inventive pick-up brush mechanism;

FIG. 6 is a fragmentary transverse section taken generally along line 6—6 of FIG. 4 and further illustrating details of the journalling and hydraulic drive motor structure shown in FIG. 5, and FIG. 7 is a partial schematic view of the inventive common hydraulic system employed for operating both hydraulic drive motors for both of the inventive pick-up brush mechanisms.

DESCRIPTION

Tractor and harvester generally

Referring to the drawings, and particularly FIG. 1, a typical tractor is indicated at T. However, it is to be noted that only the front portions of the tractor and bean harvester are illustrated herein, because these are the only portions with which the inventive pick-up brush means are associated. Thus, the front wheels of tractor T are schematically indicated at W and are journalled on axles (not shown) leading from upright struts S connected by transverse cross rod C supported on a block assembly B depending from the forward end of longitudinal frame members F, which are securely fastened to the body of the tractor as indicated by the illustrated bolts. Inasmuch as FIG. 1 illustrates only one side of the tractor T, it is important to note that an illustration of the other side would show substantially the same structure. Hence where members, such as S, are referred to, it is obvious that there are two such members, even though only one is illustrated.

Continuing with FIG. 1, the overall bean harvester apparatus suitably associated with tractor T includes a plate or yoke 10 suitably secured to each side of the tractor, such as by the illustrated bolts. This plate includes a front, generally horizontal arm 10a supporting and bolted to each lateral side of hydraulic fluid reservoir or tank 12, which not only is operatively associated with certain portions of the harvester apparatus, but also with the inventive pick-up brush means, to be described in detail below. Plate 10 also includes a forwardly and upwardly inclined upper arm 10b to which is welded a rearwardly and upwardly inclined plate or arm 16, and at its rear end, this plate provides a pivotal support 18 for a hydraulic fluid motor 20 of tht piston-cylinder type. This motor is suitably connected by hydraulic lines (not shown) to a main hydraulic system (not shown), and includes a reciprocal piston head 22 which is suitably pivotally attached to the rear depending arm 24a of a bellcrank lever 24, which in turn, is pivotally mounted on arm 10b by a pivot pin 26 or the like.

At its lower end, lever arm 24a is provided with an elongated and generally horizontally and rearwardly extending chain 28 which is operatively associated at its rear end (not shown) with the harvester apparatus. Front lever arm 24b is pivotally connected as at 30 to the upper end of a depending elongated link or strut 32, the lower end of which is pivotally connected at 34 to an elongated side ba 36 which forms part of the threshing or picking reel frame to be described below. As seen in FIG. 2, link 32 is spaced from bar 36 by a collar 37, and it will be evident from this figure that the motor 20, bellcrank 24, chain 28, link 32 and side bar 36 are arranged on each side of tractor T.

Thus, when motor 20 is activated by a tractor driver-actuated control (not shown), not only are the front ends of side bars 36 raised or lowered, but also their rear ends through chain 28, thereby controlling the elevation and maintaining the desired upwardly and forwardly inclined angular disposition of each picking reel mechanism supported by such side bars. Inasmuch as this structure forms no part of the present invention, and is generally quite similar to that disclosed in detail in the aforesaid Pat. No. 3,165,876, no further detailed description is necessary.

Apron structure

Continuing with FIG. 1, there is suitably mounted on the front end portion of each side bar 36 a gathering apron or prow assembly, generally indicated at 38. Lateral members 40 are illustrated in FIG. 2 as being suitable mountings for such gathering apron assemblies, each of which rides upon a shoe 42 passing over the ground, and projecting forwardly from such assembly are one or more ground engaging tines 44. The purpose of this apron assembly structure is to wedge beneath the prostrate branches of the bean plants in each row as the tractor and harvester apparatus is propelled therealong, so that the plants will be erected for proper engagement with the threshing reel and conveyor apparatus presently to be described. Once again, the apron assembly illustrated in FIG. 1 is duplicated on each side of tractor T so that the harvesting apparatus can simultaneously operate on two adjacent rows of bean plants, these rows being schematically indicated by the vertical center lines R shown in FIG. 2, it being noted that the apron assemblies are located slightly to the inboard sides of rows R and operate primarily to erect the inboard plant branches. Obviously, however, the dual apron assemblies of aforesaid Pat. No. 3,165,876 also could be used.

Threshing reel and conveyor frame structure

Referring now to FIGS. 1, 2 and 3, the frame supporting the threshing reel mechanism and conveyor includes a bottom wear plate 46 spanning and welded to the lower edges of side bars 36, and these side bars are reinforced by a transverse inverted cross channel 47 welded thereto. Side bars 36, together with wear plate 46 and an upwardly and forwardly curved scow-like prow 48 form a housing for the power driven conveyor apparatus receiving the picked bean pods, leaves, stems, and this conveyor apparatus including a transverse front roller 50 journalled in side bars 36, and over which roller is trained an endless conveyor belt 52. For a more complete description of such conveyor apparatus, reference is directed to aforesaid Pat. No. 3,165,876.

Continuing with the supporting frame structure, side bars 36 are connected across their top edges by a transverse angle member 54 welded thereto, and this angle member is in turn, reinforced by welded gussets 56. Further reinforcement is provided by a smaller and rearwardly disposed, inverted transverse angle member 58 welded to member 54, and likewise reinforced by welded gussets 60. An upper and rearwardly disposed, smaller transverse angle member 62 is bolted to the rear face of the upright transverse flange of angle member 54 and as best shown in FIG. 2, an upright angle member 64 is welded to each outer end of member 62. The upper and lower edges of each member 64 are beveled, and to each such upper edge is welded the similarly beveled adjacent inner edge of a generally horizontal wing or end transverse angle member 66. The adjacent transverse flanges of each pair of members 64 and 66 are suitably bolted to an upright and rearwardly disposed, transverse bearing plate 68 provided with a downwardly open slot 70 for insertion and removal of threshing reel shaft 72 which is journalled in a bearing block 74 suitably bolted to plate 68.

As will be evident from FIG. 2, this shaft supporting structure is duplicated on each side of tractor T, and wing angle members 66 are connected by a transverse angle member 76 suitably welded thereto. This transverse angle member is further provided with two laterally spaced and rearwardly disposed, transverse upright bearing plates 78 suitably welded thereto. Such bearing plates severally are provided with through bores 79 which act as journals for the two cleaning brush shafts 80 supporting brushes 82; and at their upper inner edges, bearing plates 78 also support upwardly and outwardly inclined baffles 84. The purpose of each brush 82 is to clean the adjacent threshing reel to be described below, and baffles 84 prevent the bean pods etc. from escaping. Once again, this structure is quite similar to that of the aforesaid patent and reference may be had thereto for further details.

Threshing reel mechanism

Continuing with FIGS. 1 and 2, the threshing or picking reel mechanism, which is indicated generally at 86, includes a disk-like end head 88 suitably fixed on the front portion of shaft 72, and as will be evident, there not only is a front head, but also a rear head (not shown). Between heads 88 there is arranged an annular series of angle irons 90, these angle irons preferably numbering eight, and being disposed parallel to and equi-distant from shaft 72. As disclosed in the aforesaid patent, angle irons 90 are provided with a slight backward rake on the order of 10° from radial and are preferably reinforced intermediate their ends by further attachment to shaft 72 (not shown). To the rear face of each backward rake flange of each angle 90 are suitably secured the coiled base portions of spring wire picking tines or fingers 92 spaced longitudinally along the angles 90. As in the aforesaid patent, longitudinal rods 94 are welded to the rear sides of tines 92 to prevent the bean plant branches from entering the crotches between the coiled base portions of the tines, and to hold such branches closer to the outboard ends of the tines for more thorough picking engagement.

As shown only in FIG. 1, the front ends of threshing reel shaft 72 and cleaning brush shaft 80 are provided with sprocket wheels 96, 98, respectively, and these sprocket wheels are driven by a chain 99 from a power take-off mechanism (not shown) mounted on the tractor.

Tractor and harvester operation

Briefly summarizing the operation of tractor T and the harvesting apparatus so far described, as the tractor is propelled along two adjacent rows R of bean plants (FIG. 2) the gathering apron or prow assemblies 38 elevate primarily the inboard plant branches for engagement with the reels 86, the upwardly moving tines 92 sweeping through such plants to remove the bean pods, etc. and deposit the same on rearwardly moving belt 52 of the central conveyor. Should any bean pods, etc. be trapped among tines 92 as they sweep upwardly and outwardly, the oppositely rotating cleaning brushes 82 have their bristles interleaving with the tines to remove and deposit such trapped material on conveyor belt 52. The baffles 84 serve to return any flying bean pods, etc. to the threshing and cleaning mechanisms.

While this harvesting apparatus operates satisfactorily, the outboard branches of the bean plants in each row do tend to resume their prostrate position once they pass the forwardly moving gathering apron assemblies 38, simply because there is nothing to prevent this from happening. Thus, both the efficiency and effectiveness of the picking operation is reduced. This problem is particularly significant adjacent the forward end of threshing reel 86 which as shown, is tilted upwardly so that tines 92 will initially engage the uppermost branches of the bean plants and gradually engage the lower branches as the harvesting apparatus continues along the rows of plants. In order to remedy this situation, the present inventive pick-up brush means has been combined with the aforedescribed harvesting apparatus.

Preferred embodiment of inventive pick-up brush means

Referring now to FIGS. 2–6 and 7 which illustrate a preferred embodiment, the inventive pick-up brush means include two otherwise identical pick-up brush mechanisms 100 arranged on opposite sides of tractor T, and a common drive system 102 (FIG. 7). Thus, description of one pick-up brush mechanism 100 will suffice for both.

Each of these mechanisms includes a sub-frame composed of a generally L-shaped angle member 104 having a transverse member or arm 106 and an integral longitudinal member or arm 108, to the latter of which is secured a separate depending angle member 110. As best seen in FIGS. 2 and 4, transverse member 106 is arranged rearwardly of bearing plate 68 and is secured thereto by the same bolts securing bearing block 74. Like plate 68, transverse member 106 is provided with a downwardly open slot alined with slot 70 for insertion and removal of reel shaft 72. This transverse member 106 is also arranged on the frame forwardly of reel 86 and extends laterally outwardly beyond the downwardly moving outer side of such reel, whereas longitudinal member 108 extends rearwardly from transverse member 106 along such downwardly moving side of reel 86 and generally parallel to the axis of shaft 72. Depending member 110 is provided at its upper end with slots 112 (only part of the lower slot being shown in FIG. 3) for adjustable securement to the rear end of longitudinal member 108 by the illustrated bolts. Hence, such depending member 110 and the structure attached thereto are adjustable upwardly and downwardly in order to vary the position of the pick-up brush relative to reel 86, the preferred position being such that the peripheries of brush 122 and reel 86 are substantially contiguous, as shown in FIG. 2.

At its lower end, depending member 110 is provided with journal means in the form of a bearing or journal block assembly generally indicated at 114 and bolted to member 110, as seen in each of FIGS. 2–6. This assembly 114 includes a housing 116 having a through bore 116a receiving a stepped rotary journal or bearing member 118 provided with an enlarged retaining collar 118a fitting in an annular recess 116b in the forward end housing 116, and at its rear end, member 118 is provided with a rearwardly projecting stub shaft 118b received in a blind bore 120a in the forward end of pick-up brush shaft 120. Such stub shaft and brush shaft are provided with alined openings and bolted together as shown in FIG. 5 for common rotation. In turn, pick-up brush 122 is provided with a central hollow bushing 122a suitably fixed on shaft 120 for rotation therewith.

It is to be noted at this point, that the axis of shaft 120 extends generally parallel to but is spaced below and to the downwardly moving side of the axis of reel shaft 72, as well as slightly on the outboard side of the adjacent plant row. Also, pick-up brush 122 is arranged so that it is tilted in the same manner as reel 86, for progressively descending sweeping action, and the brush has its rear edge adjacent to or touching the ground for sweeping and urging the bean plants, particularly from their outboard side, upwardly and inwardly into the desired intimate engagement with the downwardly moving picking fingers or tines 92, for thorough combing of the bean plants in the adjacent row. Just as with reel 86, brush 122 initially engages the plant branches at a higher point and gradually sweeps into the lower branches as tractor T is propelled along the rows, but being located below and adjacent to the front end of reel 86, the brush insures erect position of the plant branches and particularly the outboard branches, for the desired intimate engagement between the picking fingers and plants. The inherent result is significant improvement in the efficiency and effectiveness of the picking or harvesting operation, as compared to prior art devices lacking such pick-up brush means, such as the aforesaid patent.

Continuing with the inventive pick-up brush mechanism, each also includes a separate drive motor generally indicated at 124. This motor is preferably of the rotary hydraulic fluid type. As best shown in FIG. 5, bearing member 118 is provided at its front end with a blind bore 118c and a keyway 118d for reception of slotted drive shaft 124a and key 124b of motor 124, for integrating the rotation of shaft 124a and bearing member 118 and transmitting such motion to pick-up brush 120. Motor 124 is held in place on the front side of bearing block housing 116 by the illustrated screws. Thus, the bearing block assembly 114 forms a double cantilever support for the rearwardly extending brush shaft 120 and the forwardly projecting motor 124, the rotational axes of which are, of course, alined.

The inventive pick-up brush means is completed by a common drive system also preferably of the hydraulic fluid type, all as shown schematically in FIG. 7. This system includes hydraulic circuitry composed of the hydraulic fluid supply tank 12 containing pump 126 connected to main pressure line 128 (to motor 20, FIG. 1, for example), and a main return line 130 leading back to tank 12. By means of T's, main pressure and return lines 128, 130 are connected by a loop line 132 having the two hydraulic motors 124 arranged in series, with the input side of the loop between the T's connected to pressure line 128 and the right hand hydraulic motor 124 being provided with an on-off valve 134 and a variable flow control valve 136 in series therewith, all as shown in FIG. 7.

Thus, the hydraulic fluid drive system of the inventive pick-up brush means is superimposed upon a hydraulic system including tank 12, pump 126 and main pressure line 128 and main return line 130, such system being used to actuate a blower (not shown). As modified however, this system performs a dual function through the common drive system 102 of the two pick-up brush mechanisms 100, simply by the addition of loop line 132 and its associated structure.

The principal advantage of using such a common hydraulic drive system for the inventive pick-up brush mechanisms is the obtaining of a constant rotational speed of both pick-up brushes 122, notwithstanding either temperature change or change in the rotational speed of the tractor motor, from which power is taken off (not shown) to drive the reel mechanisms 86. At the same time, depending upon rankness of the bean plant growth, the rotational speed of pick-up brush 122 readily can be adjusted by flow control valve 136, and a typical range of adjustment is from about 35 to about 100 r.p.m. While there is no need to corollate the rotation of pick-up brush 122 with that of reel mechanism 86, typical rotational speed of the latter is about 140 r.p.m. Thus, the ratio of reel rotational speed to pick-up brush rotational speed ranges from about 4:1 to 1.4:1, and this has been found to produce quite satisfactory results, especially in view of the adjustability of the speed of pick-up brush 122, depending upon rankness of plant growth. The speed of picking reel mechanism 86, of course, can be adjusted, but normally 140 r.p.m. is quite adequate, notwithstanding rankness of plant growth.

OPERATION

To summarize the overall operation not only of the bean harvesting apparatus, but also that of the inventive pick-up brush means, tractor T is propelled along and between two adjacent rows R (FIG. 2) of the bean plants. The leading gathering aprons 38 are spaced slightly to the inboard sides of the bases of the bean plants, so as to wedge the branches, particularly the inboard branches, into an erect position for engagement with reel mechanism 86, the axis of rotation of which is located above but slightly inboard of the longitudinal axis of each row, to provide the desired upward sweeping movement toward the conveyor. On the other hand, the pick-up brush mechanisms 100 are arranged closely adjacent the outboard sides of the bases of the plants in the adjacent rows, and each rotates oppositely to that of the adjacent reel to urge such outboard branches upwardly and inwardly to an erect position so that the downwardly moving tines or picking fingers 92 intimately engage and sweep through and across substantially the entire width of such bean plants, for more thorough picking or threshing thereof, resulting in increased efficiency and effectiveness of the picking operation.

From the foregoing detailed description and illustration of the single preferred embodiment, it now will be evident how the invention accomplishes its objectives. Likewise, the aforementioned and numerous additional objects and advantages of the invention are now apparent. While reference has been made herein only to a single preferred embodiment, it is to be understood that various changes and modifications may be made in the invention by those skilled in the art without departing from the inventive concept.

What is claimed is:

1. A bean harvester having a frame adapted to be propelled along a row of bean plants in a field, a threshing reel journalled on said frame to rotate about an axis arranged above and extending longitudinally of said row, picking fingers projecting in a generally radial direction from said reel to engage and comb said bean plants in said row, means rotating said reel to effect upward movement of said picking fingers through said plants, and a conveyor arranged on the upwardly moving side of said reel to receive the bean pods, leaves and stems removed from said bean plants by said upwardly moving picking fingers; wherein the improvement comprises: pick-up means arranged on the outboard side of said row and on the downwardly moving side of said reel to urge said bean plants upwardly and inwardly into intimate engagement with said downwardly moving picking fingers for thorough combing of said bean plants in said row, resulting in increased efficiency and effectiveness of the picking operation, said pick-up means including a rotary brush journalled on said frame about an axis generally parallel to, but spaced below and to the downwardly moving side of the axis of said reel and having bristles engageable with said row of bean plants, and drive means rotating said brush in a direction opposite to that of said reel, whereby the upwardly moving bristles of said brush force said bean plants in said row upwardly and inwardly into intimate combing engagement with said downwardly moving picking fingers.

2. The harvester of claim 1 wherein said pick-up means also include a sub-frame having a transverse member arranged on said frame forwardly of said reel and extending laterally beyond the downwardly moving side of said reel, a longitudinal member extending rearwardly from said transverse member along said downwardly moving side of said reel and a depending member extending downwardly from said longitudinal member and provided with journal means supporting said drive means; and said rotary brush is provided with a shaft operatively associated with and extending rearwardly from said journal means along the downwardly moving side of said reel and driven by said drive means.

3. The harvester of claim 2 wherein said drive means includes a fluid motor operatively associated with said journal means and shaft of said rotary brush, and said depending member is adjustable longitudinally on said longitudinal member for varying the position of said pick-up brush relative to said reel.

4. A bean harvester having a frame adapted to be propelled along and between laterally spaced rows of bean plants in a field, a threshing reel journalled on said frame to rotate about an axis arranged above and extending longitudinally of each adjacent row, picking fingers projecting in a generally radial direction from each of said reels to engage and comb said bean plants in each adjacent row, means rotating said reels to effect upward movement of said fingers through said plants in each adjacent row and a central conveyor arranged on the upwardly moving side of each of said reels to receive the bean pods, leaves and stems removed from said bean plants in each row by said upwardly moving fingers; wherein the improvement comprises: a pick-up mechanism arranged on the outboard side of each adjacent row and on the downwardly moving side of each of said reels to urge said bean plants in each adjacent row upwardly and inwardly into intimate engagement with said downwardly moving picking fingers for thorough combing of said bean plants in each of said rows, resulting in increased efficiency and effectiveness of the picking operation, and a common power system for driving each of said pick-up mechanisms, each of said pick-up mechanisms including a rotary brush journalled on said frame about an axis generally parallel to, but spaced below and to the downwardly moving side of the axis of each adjacent reel and having bristles engageable with each adjacent row of bean plants, and a drive motor rotating each adjacent brush in a direction opposite to that of each adjacent reel, whereby the upwardly moving bristles of each of said brushes force said bean plants in each adjacent row upwardly and inwardly into intimate combing engagement with said downwardly moving picking fingers of each adjacent reel.

5. The harvester of claim 4 wherein each of said pick-up mechanisms includes a rotary brush journalled on said frame about an axis generally parallel to, but spaced below and to the downwardly moving side of the axis of each adjacent reel and having bristles engageable with each adjacent row of bean plants, and a drive motor rotating each adjacent brush in a direction opposite to that of each adjacent reel, whereby the upwardly moving bristles of each of said brushes force said bean plants in each adjacent row upwardly and inwardly into intimate combing engagement with said downwardly moving picking fingers of each adjacent reel.

6. The harvester of claim 5 wherein each of said pick-up mechanisms also includes a sub-frame having a transverse member arranged on said frame forwardly of each adjacent reel and extending laterally beyond the downwardly moving side of each adjacent reel, a longitudinal member extending rearwardly from said transverse member along said downwardly moving side of each adjacent reel and a depending member extending downwardly from said longitudinal member and provided with journal means supporting each adjacent drive motor, each of said rotary brushes is provided with a shaft operatively associated with and extending rearwardly from each adjacent journal means along the downwardly moving side of each adjacent reel and driven by each adjacent drive motor, each of said journal means forms a cantilever support for each adjacent brush shaft and drive motor, and each of said depending members is adjustable longitudinally on each adjacent longitudinal member for varying the position of each of said brushes relative to each adjacent reel.

7. The harvester of claim 6 wherein each of said drive motors is of a rotary hydraulic fluid type operatively associated with each adjacent journal means and shaft of each adjacent rotary brush, and said common drive system includes a hydraulic fluid circuit carrying a supply reservoir provided with a pump and a loop line connected to said pump and reservoir and containing said hydraulic drive motors arranged in series.

References Cited
UNITED STATES PATENTS

| | | | |
|---|---|---|---|
| 2,938,325 | 5/1960 | Chase | 56—130 |
| 3,165,876 | 1/1965 | Towson | 56—19 X |
| 3,173,236 | 3/1965 | Byrd | 56—119 |
| 3,282,036 | 11/1966 | Paulson et al. | 56—19 |

RUSSELL R. KINSEY, Primary Examiner

U.S. Cl. X.R.

56—130